Patented May 19, 1936

2,040,928

UNITED STATES PATENT OFFICE 2,040,928

ALKOXY-ALKYL-AMINO-BENZOTHIAZOLES AND THEIR PRODUCTION

Max Engelmann, Wilmington, Del., assignor to E. I. du Pont de Nemours & Company, Wilmington, Del., a corporation of Delaware No Drawing. Application July 14, 1932, Serial No. 622,461

1 Claim. (Cl. 260—44)

This invention relates to imino-benzo-thiazoles having the general formula:

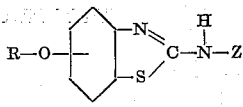

where R is an aliphatic radical and Z is an aliphatic radical.

I have found that compounds of the above general formula in which the total number of carbon atoms in the radicals R and Z is greater than 3, possess very pronounced local anesthetic properties, and are superior in this respect to compounds in which Z stands for hydrogen or in which the total number of carbons in R and Z is less than 3.

It is accordingly an object of my invention to prepare novel compounds of the above general formula which are characterized by superior local anesthetic properties. Other and further important objects of this invention will appear as the description proceeds.

The production of these novel aryl thiazoles follows in general the procedure for the production of related aryl-thiazoles as disclosed, for instance, in U. S. Pat. No. 1,910,489. More particularly, I react with a halogenating agent upon the corresponding aryl-thiourea in an organic liquid which is inert toward the reactants used.

The invention will be further understood from the following detailed description and specific examples in which the parts are given by weight.

Throughout the specification and claim the chemical compounds mentioned have been numbered in accordance with the following numbering scheme:

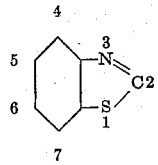

as proposed by Bogert in the Journal of the American Chemical Society, vol. 44, page 826.

Example I

Twenty-three and eight-tenths (23.8) parts of para-n-butyloxy-phenyl-mono-methyl-thiourea (made from para-n-butyloxy-phenyl mustard oil and mono-methyl-amine) and having a melting point of 92° C. were added to 100 parts of ethylene dichloride and thereafter 16 parts of bromine added to the mixture. The thiourea dissolved with the evolution of heat and shortly thereafter a gradual precipitation occurred. The reaction mixture was heated for about one-quarter of an hour over a boiling water bath and after cooling the precipitated crystalline product was filtered off. This product was washed with ether, dissolved in water and filtered to remove a small amount of an insoluble residue. Thereafter 6-n-butyloxy-2-methyl-amino-benzo-thiazole was precipitated by passing ammonia through the filtrate. The precipitate was filtered off and crystallized from toluene. This compound is soluble in acetone, alcohol, aqueous acids (both organic and inorganic), benzene and ether. It is substantially insoluble in water. The melting point of this thiazole is 117° C.

Example II

In a manner similar to that described in Example I, 6-ethoxy-2-hydroxy-ethyl-amino-benzo-thiazole having a melting point of 125° C. was produced by using proportionate quantities of the corresponding chemical compounds.

Example III

By using proportionate quantities of corresponding compounds in the manner set out in Example I, 6-ethoxy-2-n-butyl-amino-benzo-thiazole having a melting point of 101° C. was produced.

Example IV

By following the procedure set out in Example I with proportionate quantities of proper compounds 6-isoamyloxy-2-mono-ethyl-amino-benzo-thiazole having a melting point of 90° C. was produced.

Example V

In the same manner as described in the preceding examples, 6-isopropyloxy-2-mono-methyl-amino-benzo-thiazole was produced. The hydrobromide of this compound has a melting point of 192° C.

The invention is not limited to the solution or suspension of the thiourea in ethylene dichloride. Any suspension agent may be used which does not chemically react with the materials used in the reaction. Such other solvents as the chloro-benzenes, particularly ortho-dichloro-benzene, benzene, carbon tetrachloride, nitrobenzene, glacial acetic acid, liquid sulphur dioxide and nitro-toluene, are especially satisfactory. In certain instances it is possible to eliminate the use of a suspension agent or solvent by using an excess of the halogenating agent. The amount of suspension agent utilized may be widely varied.

The invention is not limited to the use of bromine as the agent for treating the thiourea to form the thiazole. Other halogenating agents, especially chlorine, sulphuryl chloride and mixtures of sulphuryl chloride and halogens, for example, bromine and sulphuryl chloride, may be used advantageously.

Pressure may be used to an advantage in carrying out the processes of the invention since it increases the solubility of any reacting gases in the suspension agent used.

These compounds readily form acid salts, for example, the hydrohalide salts particularly the hydrochloride and hydrobromide. Special mention may also be made of the nitrate, the chloracetate, the formate, the oxalate, the disulphate (thiazole$_2$·H$_2$SO$_4$) and the di-phosphate (thiazole$_2$·H$_3$PO$_4$).

It may be that in some instances the compounds produced according to this invention exist in a tautomeric form. Such compounds are regarded as a part of this invention and whenever formulæ or names are used in this application it is intended that the compound be covered regardless of the tautomeric form in which it actually exists.

So far as is now known, compounds having the chemical structure above set out have never before been made. These new compounds are crystalline bodies of basic character and as stated above, form stable salts with acids. They possess valuable local anesthetic properties and are also useful as intermediates in the organic chemical industry.

As many apparently widely different embodiments of this invention may be made without departing from the spirit and scope thereof, it is to be understood that I do not limit myself to the specific embodiments thereof except as defined by the appended claim.

I claim:

6-n-butyloxy - 2 - methylimino - benzothiazole, said compound having a melting point of about 117° C.

MAX ENGELMANN.